US012394384B2

(12) United States Patent
Zhang

(10) Patent No.: US 12,394,384 B2
(45) Date of Patent: Aug. 19, 2025

(54) DISPLAY PANEL AND DISPLAY DEVICE

(71) Applicants: Wuhan Tianma Microelectronics Co., Ltd., Wuhan (CN); Wuhan Tianma Microelectronics Co., Ltd. Shanghai Branch, Shanghai (CN)

(72) Inventor: Mengmeng Zhang, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/652,392

(22) Filed: May 1, 2024

(65) Prior Publication Data

US 2024/0282268 A1 Aug. 22, 2024

(30) Foreign Application Priority Data

Jul. 24, 2023 (CN) ........................ 202310914871.3

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2300/0426* (2013.01)

(58) Field of Classification Search
None
See application file for complete search history.

(56) References Cited

U.S. PATENT DOCUMENTS

2009/0021662 A1* 1/2009 Chang .................. G02F 1/1368 349/46
2017/0178583 A1* 6/2017 Zhang .................. G09G 3/3677
2020/0342811 A1* 10/2020 Xuan .................. G09G 3/3266
2022/0208099 A1* 6/2022 Liu ...................... G09G 3/3258
2022/0358881 A1* 11/2022 Chae .................... G09G 3/3266
2023/0141543 A1* 5/2023 Gu ........................ G11C 19/28 345/206
2024/0038143 A1* 2/2024 Yang .................... G09G 3/3275

FOREIGN PATENT DOCUMENTS

CN 208271541 U 12/2018

* cited by examiner

*Primary Examiner* — Nitin Patel
*Assistant Examiner* — Amen W Bogale
(74) *Attorney, Agent, or Firm* — KDW FIRM PLLC

(57) ABSTRACT

Provided are a display panel and a display device, where the number of pixels in a pixel row included in a first display region of the display panel is smaller than the number of pixels in a pixel row included in a second display region, a first scan line is electrically connected to one first scan control circuit, and a second scan line is electrically connected to two second scan control circuits, where in the case where the ratio of the number of pixels in the first pixel row to the number of pixels in the second pixel row is within a first preset range, smaller than a minimum value of the first preset range, or larger than a maximum value of the first preset range.

21 Claims, 6 Drawing Sheets

DISPLAY PANEL AND DISPLAY DEVICE

CROSS-REFERENCE TO RELATED APPLICATION

This application claims priority to Chinese Patent Application No. 202310914871.3 filed Jul. 24, 2023, the disclosure of which is incorporated herein by reference in its entirety.

TECHNICAL FIELD

The present disclosure relates to the field of display technology and, in particular, to a display panel and a display device.

BACKGROUND

In the related art, for some smart devices to match a camera region, a display region thereof may be irregular in shape. For display panels with irregular regions, due to different numbers of pixels in pixel rows in different regions, the use of the same scan control method results in a delay of scan control between different regions, affecting the overall display of a screen.

SUMMARY

The present disclosure provides a display panel and a display device.

The present disclosure provides a display panel, including a first display region and a second display region, where the first display region includes a first pixel row, and the second display region includes a second pixel row. The number of pixels in the first pixel row is a, and the number of pixels in the second pixel row is b, where $0<a<b$. The display panel also includes a first scan control circuit, a second scan control circuits, a first scan line, and a second scan line, where the first scan line is electrically connected to pixels in the first pixel row and one first scan control circuit, and the second scan line is electrically connected to the pixels in the second pixel row and two second scan control circuits. A first scan control circuit includes a first output transistor, and a second scan control circuit includes a second output transistor, where the ratio of the number of pixels in the first pixel row and the number of pixels in the second pixel row is within a first preset range, and the ratio of the channel width-to-length ratio of the first output transistor to the channel width-to-length ratio of the second output transistor is a first ratio. Alternatively, the ratio of the number of pixels in the first pixel row to the number of pixels in the second pixel row is smaller than the minimum value of the first preset range, and the ratio of channel the width-to-length ratio of the first output transistor to the channel width-to-length ratio of the second output transistor is a second ratio. Alternatively, the ratio of the number of pixels in the first pixel row to the number of pixels in the second pixel row is larger than the maximum value of the first preset range, and the ratio of channel width-to-length ratio of the first output transistor to the channel width-to-length ratio of the second output transistor is a third ratio.

The present disclosure further provides a display device including a display panel, and the display panel includes a first display region and a second display region, where the first display region includes a first pixel row, and the second display region includes a second pixel row. The number of pixels in the first pixel row is a, and the number of pixels in the second pixel row is b, where $0<a<b$. The display panel also includes a first scan control circuit, a second scan control circuits, a first scan line, and a second scan line, where the first scan line is electrically connected to pixels in the first pixel row and one first scan control circuit, and the second scan line is electrically connected to the pixels in the second pixel row and two second scan control circuits. A first scan control circuit includes a first output transistor, and a second scan control circuit includes a second output transistor, where the ratio of the number of pixels in the first pixel row and the number of pixels in the second pixel row is within a first preset range, and the ratio of the channel width-to-length ratio of the first output transistor to the channel width-to-length ratio of the second output transistor is a first ratio. Alternatively, the ratio of the number of pixels in the first pixel row to the number of pixels in the second pixel row is smaller than the minimum value of the first preset range, and the ratio of channel the width-to-length ratio of the first output transistor to the channel width-to-length ratio of the second output transistor is a second ratio. Alternatively, the ratio of the number of pixels in the first pixel row to the number of pixels in the second pixel row is larger than the maximum value of the first preset range, and the ratio of channel width-to-length ratio of the first output transistor to the channel width-to-length ratio of the second output transistor is a third ratio.

BRIEF DESCRIPTION OF DRAWINGS

The drawings, which are incorporated in the specification and form part of the specification, illustrate embodiments of the present disclosure and are intended to explain the principles of the present disclosure together with the description of the drawings.

To illustrate the technical solutions in embodiments of the present disclosure or the technical solutions in the related art more clearly, the drawings used in the description of the embodiments or the related art are briefly described below. Apparently, those of ordinary skill in the art may obtain other drawings based on the drawings described below on the premise that no creative work is done.

DETAILED DESCRIPTION

To obtain a clearer understanding of the objects, features and advantages of embodiments of the present disclosure, solutions in the embodiments of the present disclosure are further described below. It is to be noted that if not in collision, the embodiments of the present disclosure and features therein may be combined with each other.

Details are set forth below to facilitate a thorough understanding of the embodiments of the present disclosure. However, the embodiments of the present disclosure may be implemented in other manners not described herein. Apparently, the embodiments in the specification are part, not all, of embodiments of the present disclosure.

It is apparent for those skilled in the art that various modifications and changes may be made to the present disclosure without departing from the spirit or scope of the present disclosure. Therefore, the present disclosure is intended to cover modifications and changes of the present disclosure that fall within the scope of the corresponding claims (the claimed technical solutions) and their equivalents. It is to be noted that the embodiments of the present disclosure may be combined with each other if not in collision.

Figure 1:
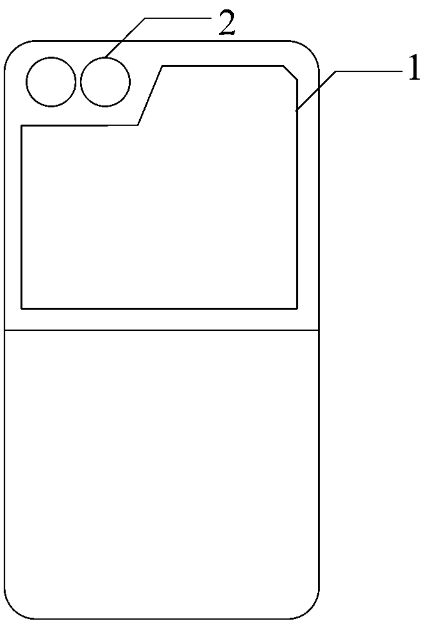
FIG. 1 is a structure diagram of an electronic device according to an embodiment of the present disclosure.

FIG. 1 shows a foldable electronic device in the related art, including a secondary display screen 1 and a camera 2. It can be seen that to match the camera 2, the secondary display screen 1 is designed to be irregular and special-shaped. Pixels in the display screen are horizontally arranged. In the special-shaped display screen, the number of pixels is inevitably different in different rows. The use of the same scan control method results in a time difference of scan control between different regions, affecting the overall display of the screen.

Figure 2:
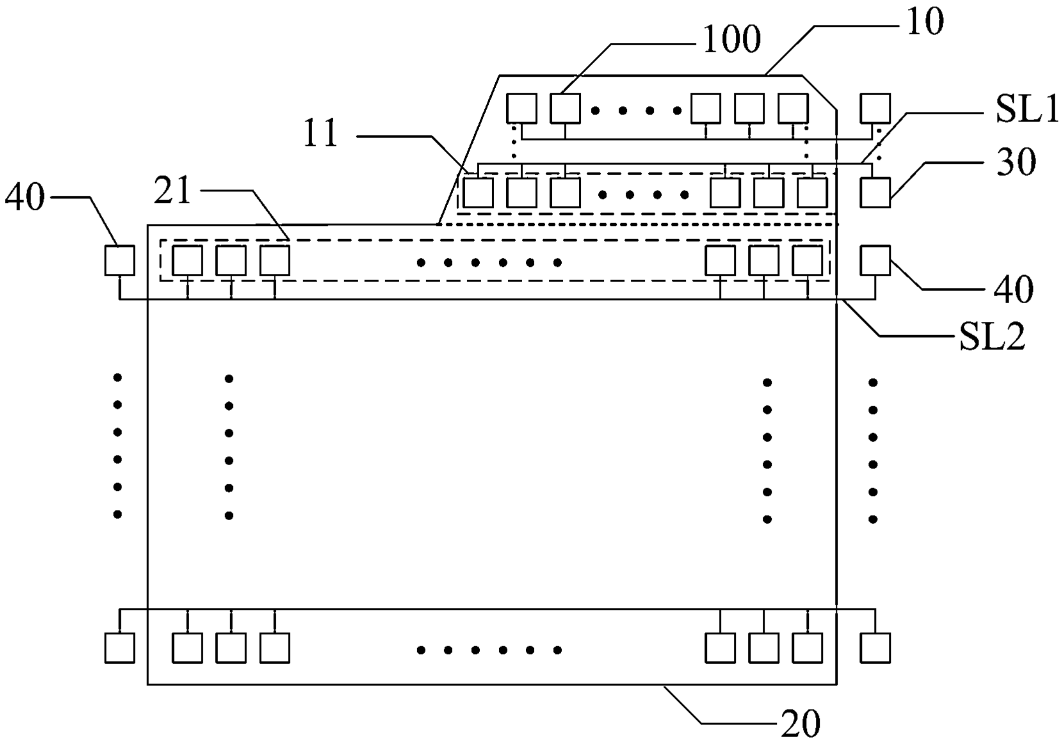
FIG. 2 is a structure diagram of a display panel according to an embodiment of the present disclosure.

In view of this, an embodiment of the present application provides a display panel. As shown in FIG. 2, the display panel includes a first display region 10 and a second display region 20, where the first display region 10 includes a first pixel row 11, the second display region includes a second pixel row 21, the first pixel row 11 and the second pixel row 21 each include multiple pixels 100, the number of pixels in the first pixel row 11 is a, and the number of pixels in the second pixel row 21 is b, where $0<a<b$. The first display region 10 and the second display region 20 together constitute a special-shaped panel.

As shown in FIG. 2, the display panel also includes a first scan control circuit 30, a second scan control circuit 40, a first scan line SL1, and a second scan line SL2. The first scan line SL1 is electrically connected to the pixels in the first pixel row 11 and one first scan control circuit 30, and the second scan line SL2 is electrically connected to the pixels in the second pixel row 21 and two second scan control circuits 40.

Specifically, as shown in FIG. 2, pixels in the pixel row may be arranged horizontally. If a scan line is connected to only one scan control circuit (for example, the first scan line SL1), the scan control circuit may be located on one side of the pixel row in a pixel arrangement direction, which is called single-sided driving. If the scan line is connected to two scan control circuits (for example, the second scan line SL2), the scan control circuits are located on two opposite sides of the pixel row in the pixel arrangement direction, which is called double-sided driving.

Specifically, the first scan control circuit 30 provides a scan control signal for each pixel in the first pixel row 11 through the first scan line SL1, and the second scan control circuits 40 provide a scan control signal for each pixel in the second pixel row 21 through the second scan line SL2. In a specific embodiment, each pixel in the first pixel row 11 and the second pixel row 21 includes multiple transistors, the first scan line SL1 is connected to a gate of a transistor in each pixel in the first pixel row 11, the second scan line SL2 is connected to a gate of a transistor in each pixel in the second pixel row 21, the transistor connected to the first scan line SL1 and the transistor connected to the second scan line SL2 have the same function in the pixels, and the first scan control circuit 30 and the second scan control circuit 40 provide the same scan control signals. Therefore, a delay between the scan control signals provided by the two scan circuits needs to be avoided, where the delay results in the screen splitting of the display panel.

The first scan control circuit 30 includes a first output transistor, and the second scan control circuit 40 includes a second output transistor. The output transistor (for example, the first output transistor or the second output transistor) is configured to provide the scan control signal (for example, an enable/disable signal for a pixel circuit) for each pixel in the pixel row. The performance of the output transistor is a critical factor for whether the delay between the scan control signals occurs.

In the case where the ratio of the number a of pixels in the first pixel row to the number b of pixels in the second pixel row is within a first preset range, the ratio of a channel width-to-length ratio of the first output transistor to a channel width-to-length ratio of the second output transistor is a first ratio. Specifically, the ratio of the channel width-to-length ratio of the first output transistor to the channel width-to-length ratio of the second output transistor may be an endpoint value of the first preset range.

Alternatively, in the case where the ratio of the number a of pixels in the first pixel row to the number b of pixels in the second pixel row is smaller than a minimum value of the first preset range, the ratio of the channel width-to-length ratio of the first output transistor to the channel width-to-length ratio of the second output transistor is a second ratio.

Alternatively, in the case where the ratio of the number a of pixels in the first pixel row to the number b of pixels in the second pixel row is larger than a maximum value of the first preset range, the ratio of the channel width-to-length ratio of the first output transistor to the channel width-to-length ratio of the second output transistor is a third ratio.

The channel width-to-length ratio of a transistor denotes the ratio of the distance between two adjacent electrodes of the transistor to the length of the transistor and is typically represented as W/L, where W denotes the width between two adjacent electrodes of the transistor, and L denotes the length of the transistor. The channel width-to-length ratio is a crucial parameter for reflecting whether the transistor is able to effectively control current and voltage and significantly affects the performance of the transistor. In general, as the channel width-to-length ratio increases, a current gain of the transistor also increases because more charge carriers are increased as the width of the transistor is relatively increased, thus increasing the current amplification capacity of the transistor. A transistor with the greater channel width-to-length ratio has a faster response speed. Therefore, in the embodiment of the present disclosure, different ratios of the channel width-to-length ratio of the first output transistor to the channel width-to-length ratio of the second output transistor are set so that the delay between the scan control signals in different display regions can be controlled.

In the embodiment of the present disclosure, the channel width-to-length ratio of the output transistor is set, and the region with the smaller number of pixels in the pixel row is specially driven on a single side so that the delay of scan control between different regions is reduced, and visual screen splitting between different regions is avoided, thereby improving the overall display effect of the panel.

Figure 3:
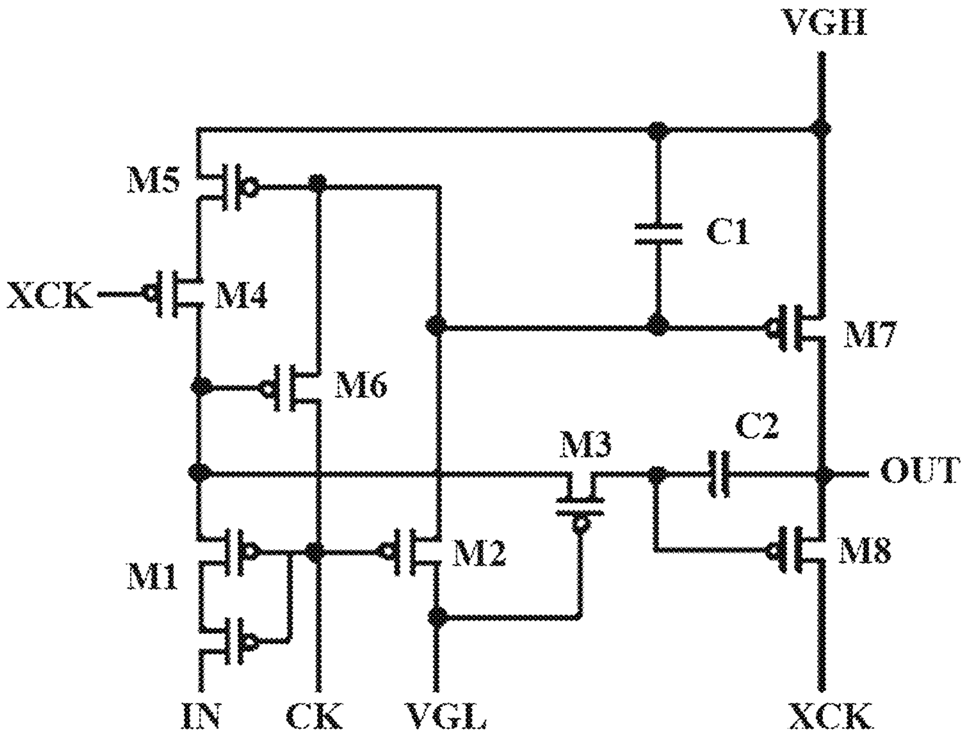
FIG. 3 is a structure diagram of a scan control circuit according to an embodiment of the present disclosure.
Figure 4:
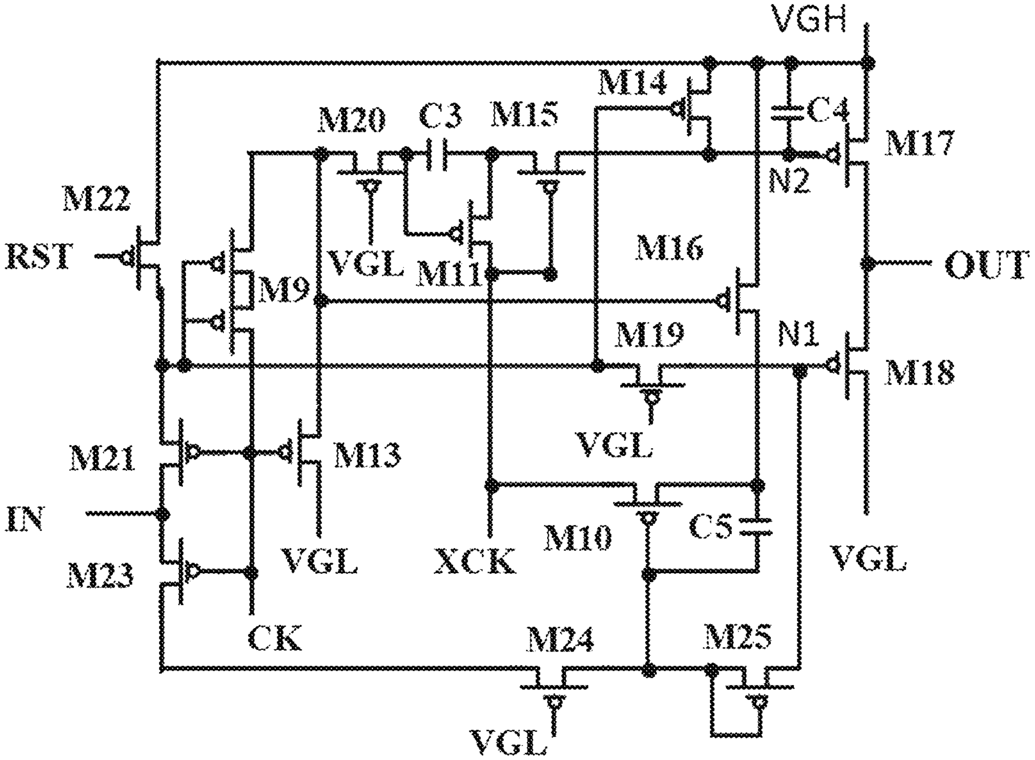
FIG. 4 is a structure diagram of another scan control circuit according to an embodiment of the present disclosure.

For ease of understanding, the embodiment of the present disclosure provides two circuit structure diagrams of the first scan control circuit or the second scan control circuit, as shown in FIGS. 3 and 4. Optionally, for each embodiment, the first scan control circuit and the second scan control circuit have the same circuit structure, and the terms "first" and "second" are used only to distinguish the scan control circuits for different regions.

In the embodiment shown in FIG. 3, the scan control circuit includes a transistor M1, a transistor M2, a transistor M3, a transistor M4, a transistor M5, a transistor M6, a transistor M7, a transistor M8, a capacitor C1, and a capacitor C2. An output terminal OUT of the circuit is connected to the scan line and provides the scan control signal for the pixels through the scan line. The transistor M7 provides a high-level signal VGH to the output terminal OUT in response to an effective level signal received by a gate, and the transistor M8 provides a clock signal XCK to the output terminal OUT in response to an effective level signal received by a gate. Therefore, the transistor M7 and the transistor M8 may each serve as the first output transistor/the second output transistor, and the corresponding channel width-to-length ratio is set accordingly.

In the embodiment shown in FIG. 4, the scan control circuit includes a transistor M9, a transistor M10, a transistor M11, a transistor M12, a transistor M13, a transistor M14, a transistor M15, a transistor M16, a transistor M17, a transistor M18, a transistor M19, a transistor M20, a transistor M21, a transistor M22, a transistor M23, a transistor M24, a capacitor C3, a capacitor C4, and a capacitor C5. An output terminal OUT of the circuit is connected to the scan line and provides the scan control signal for the pixels through the scan line. The transistor M17 provides a high-level signal VGH to the output terminal OUT in response to an effective level signal received by a gate, and the transistor M18 provides a low-level signal VGL to the output terminal OUT in response to an effective level signal received by a gate. Therefore, the transistor M17 and the transistor M18 may each serve as the first output transistor/the second output transistor, and the corresponding channel width-to-length ratio is set accordingly.

The embodiments of FIGS. 3 and 4 are provided only for illustrating the position of the first output transistor and the second output transistor in the first scan control circuit and the second scan control circuit and are not to limit the scan control circuit to the embodiments of FIGS. 3 and 4. For scan control circuits other than the preceding embodiments, the first output transistor or the second output transistor functions the same as in the preceding embodiments, and the first output transistor or the second output transistor can be determined according to the function thereof in the scan control circuit. Those skilled in the art can set the channel width-to-length ratio of the output transistor in other scan control circuits according to the preceding embodiments in practice. Other transistors in the scan control circuit are not within the scope of the inventive concept of the embodiment of the present disclosure, which are not described in detail herein.

Optionally, the second ratio is smaller than the first ratio, and the first ratio is smaller than the third ratio.

When the ratio of the number of pixels in the first pixel row to the number of pixels in the second pixel row is smaller than the minimum value of the first preset range, and a relatively small number of pixels are driven, the scan control signal for the first pixel row needs to be slightly lagged. Optionally, the channel width-to-length ratio of the first output transistor is configured to be relatively small relative to the channel width-to-length ratio of the second output transistor. When the ratio of the number of pixels in the first pixel row to the number of pixels in the second pixel row is within the first preset range, since the scan control signal for the first pixel row has been improved through single-sided driving, the channel width-to-length ratio of the first output transistor may have no difference or have a slight difference relative to the channel width-to-length ratio of the second output transistor. When the ratio of the number of pixels in the first pixel row to the number of pixels in the second pixel row is larger than the maximum value of the first preset range, the scan control signal for the second pixel row needs to be slightly lagged so that a relatively large number of pixels can be driven on a single side. Optionally, the channel width-to-length ratio of the first output transistor is configured to be larger than the channel width-to-length ratio of the second output transistor.

As shown in FIG. 2, the first display region 10 and the second display region 20 each include multiple pixel rows, and each pixel row is correspondingly connected to at least one scan control circuit. In practice, with the channel width-to-length ratio of the second output transistor as reference, the channel width-to-length ratio of the first output transistor in each first scan control circuit, which is set according to the preceding embodiment, may be the same or different. For example, the number of pixels in different pixel rows in the first display region 10 may increase or decrease gradually according to an arrangement order of the pixel rows. When the setting in the preceding embodiment is made to different pixel rows in sequence, the channel width-to-length ratios of the first output transistors in multiple first scan control circuits may be different.

In practice, to facilitate production, it is generally preferable to change the channel width-to-length ratio of the first output transistor according to only the channel width-to-length ratio of the second output transistor, that is, for two display panels with the same channel width-to-length ratio of the second output transistor, the channel width-to-length ratios of the first output transistors in the two display panels may be different due to different ratios of the number of pixels in the first pixel row to the number of pixels in the second pixel row.

Optionally, in the case where the ratio of the number of pixels in the first pixel row to the number of pixels in the second pixel row is within the first preset range, the first ratio $R_1$ is:

$$R_1 = \frac{n}{m} = 1 \pm \alpha;$$

where $\alpha$ denotes a process error parameter, n denotes the channel width-to-length ratio of the first output transistor, and m denotes the channel width-to-length ratio of the second output transistor. Specifically, the first output transistor and the second output transistor may be of the same type (p-type or n-type) and have the same physical parameters. However, since output transistors at different positions may exhibit a process error during production, the ratio of the channel width-to-length ratio of the first output transistor to the channel width-to-length ratio of the second output transistor is defined as the first ratio $R_1$.

Optionally, the first preset range is:

$$\frac{1}{3} \le \frac{a}{b} \le \frac{2}{3}.$$

The preceding embodiment of the present disclosure provides specific values of the first preset range. As long as the ratio of the number of pixels in the first pixel row to the number of pixels in the second pixel row is set within the first preset range, the time difference of scan control between different regions can be reduced through the single-sided driving without changing the model (type and physical parameters) of the first output transistor, which avoids the visual screen splitting between different regions, improves the overall display effect of the panel, and facilitates production and manufacturing.

In a specific embodiment, if the number of pixels in the pixel rows in the first display region increases or decreases gradually, to prevent the model of the output transistor from being changed, the ratio of the number of pixels in all the pixel rows in the first display region to the number of pixels in the second pixel row may be set within the first preset range.

Optionally, as shown in FIG. 2, in the case where the first pixel row 11 is adjacent to the second pixel row 21, the ratio of the number of pixels in the first pixel row 11 to the number of pixels in the second pixel row 21 is within a second preset range, where a minimum value of the second preset range is larger than the minimum value of the first preset range, and a maximum value of the second preset range is smaller than the maximum value of the first preset range.

The display effect of a boundary between the first display region and the second display region determines whether noticeable screen splitting occurs in the display panel. Therefore, the number of pixels in the first pixel row at the boundary needs to be more accurate, that is, the range within which the number of pixels in the first pixel row at the boundary can be set is narrowed.

Optionally, a is the number of pixels in the first pixel row and b is the number of pixels in the second pixel row. Based on the first preset range $$\frac{1}{3} \le \frac{a}{b} \le \frac{2}{3},$$

the second preset range is:

$$\frac{2}{5} \le \frac{a}{b} \le \frac{3}{5}.$$

Optionally, in the case where the ratio of the number of pixels in the first pixel row to the number of pixels in the second pixel row is smaller than the minimum value of the first preset range, a range of the second ratio $R_2$ is:

$$R_2 = \frac{n}{m} < 1.$$

where n denotes the channel width-to-length ratio of the first output transistor, and m denotes the channel width-to-length ratio of the second output transistor.

Optionally, the range of the second ratio $R_2$ is:

$$\frac{1}{3} \le R_2 < 1.$$

If the channel width-to-length ratio of the first output transistor is too small, the display performance of the first display region is significantly affected, and the control of the first scan control circuit is also affected. Thus, the channel width-to-length ratio of the first output transistor is smaller than the channel width-to-length ratio of the second output transistor within a limited range.

In some embodiments, in the case where the ratio of the number of pixels in the first pixel row to the number of pixels in the second pixel row is larger than the maximum value of the first preset range, a range of the third ratio $R_3$ is:

$$R_3 = \frac{n}{m} > 1.$$

where n denotes the channel width-to-length ratio of the first output transistor, and m denotes the channel width-to-length ratio of the second output transistor.

Optionally, the range of the third ratio $R_3$ is:

$$1 < R_3 \le \frac{4}{3}.$$

If the channel width-to-length ratio of the first output transistor is too large, the display performance of the first display region is significantly affected, and the control of the first scan control circuit is also affected. Thus, the channel width-to-length ratio of the first output transistor is set to be larger than the channel width-to-length ratio of the second output transistor within a limited range.

Optionally, the first output transistor is configured to provide a first clock signal for the pixels in the first pixel row, and the second output transistor is configured to provide a second clock signal for the pixels in the second pixel row. In a specific embodiment, the first clock signal provided by the first output transistor and the second clock signal provided by the second output transistor are the same.

When the scan control circuit is configured to provide a clock signal for the pixel row, a higher requirement is put on an output delay of the clock signal. Therefore, a relationship between the channel width-to-length ratios of the output transistors in the scan control circuits needs to be set according to a relationship between the numbers of pixels in different regions so that the time difference of scan control between different regions is reduced, and the visual screen splitting between different regions is avoided, thereby improving the overall display effect of the panel.

Optionally, the first scan control circuit also includes a fifth output transistor, where the ratio of a channel width-to-length ratio of the fifth output transistor to the channel width-to-length ratio of the first output transistor is a preset ratio.

Specifically, as shown in FIGS. 3 and 4, the first scan control circuit may include both two output transistors (for example, the transistor M7 and the transistor M8 in the embodiment of FIG. 3, or the transistor M17 and the transistor M18 in the embodiment of FIG. 4). When one of the two output transistors is used as the first output transistor, the other of the two output transistors is used as the fifth output transistor. After the channel width-to-length ratio of the first output transistor is determined according to the channel width-to-length ratio of the second output transistor in the second scan control circuit, to match the first output transistor, the fifth output transistor needs to be adjusted according to the channel width-to-length ratio of the first output transistor and the preset ratio.

For scan control circuits other than the preceding embodiment, the first output transistor and the fifth output transistor have the same functions as in the preceding embodiment, and the first output transistor and the fifth output transistor can be determined according to their functions in the scan control circuit.

Figure 5:
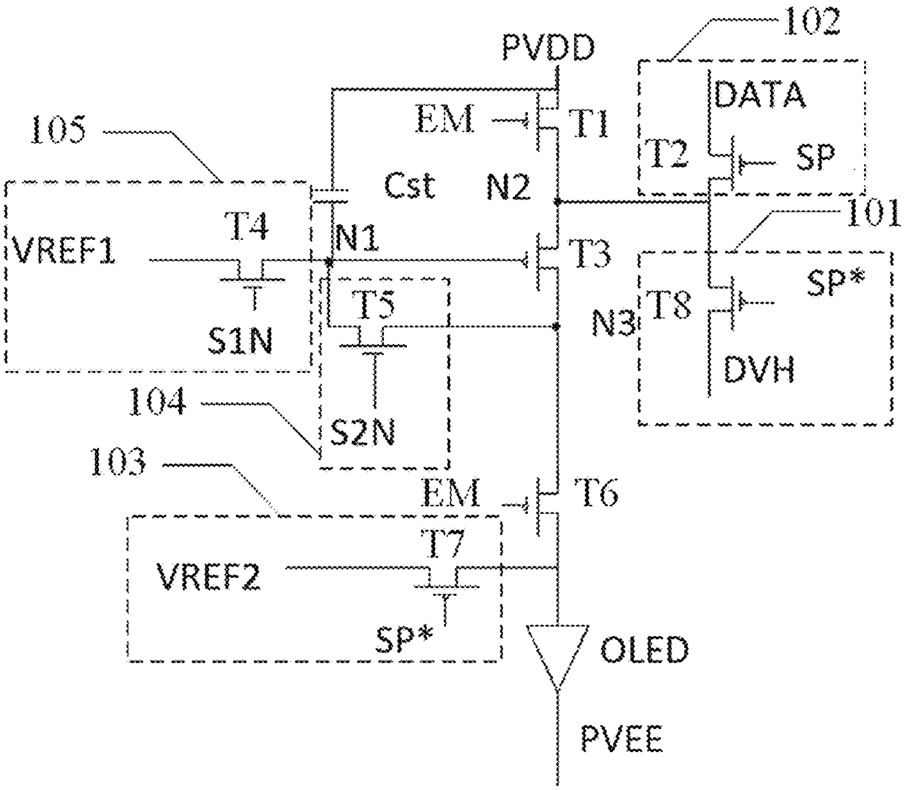
FIG. 5 is a structure diagram of a pixel circuit according to an embodiment of the present disclosure.

In a specific embodiment, as shown in FIG. 5, the pixel circuit in the first pixel row and the second pixel row includes a transistor T1, a transistor T2, a drive transistor T3, a transistor T4, a transistor T5, a transistor T6, a transistor T7, a transistor T8, a storage capacitor Cst, and a light-emitting element OLED. The transistor T1 and the transistor T6 are configured to control a driving circuit of the light-emitting element OLED to be turned on or off. The transistor T2 is used as a data writing module 102 of the circuit and configured to write a data signal DATA to the drive transistor T3. The drive transistor T3 is configured to provide a drive signal for the light-emitting element OLED. The transistor T4 is used as a drive initialization module 105 of the circuit and configured to provide an initialization signal for the drive transistor T3. The transistor T5 is used as a threshold compensation module 104 of the circuit and configured to provide threshold compensation for the drive transistor T3. The transistor T7 is used as a light-emitting element initialization module 103 and configured to provide an initialization voltage for a cathode of the light-emitting element OLED. The transistor T8 is used as a bias module 101 of the circuit and configured to reset a voltage of a first electrode of the drive transistor T3 so that a bias state of the drive transistor T3 is adjusted.

Based on the preceding pixel circuit, optionally, each pixel in the first pixel row includes a first data writing module, and each pixel in the second pixel row includes a second data writing module, where both the first data writing module and the second data writing module can refer to the data writing module 102 in the embodiment of FIG. 5. The first scan line is electrically connected to the first data writing module and the one first scan control circuit, and the second scan line is electrically connected to the second data writing module and the two second scan control circuits. Specifically, as shown in FIG. 5, each of the first scan line and the second scan line is connected to a gate of the transistor T2 as the data writing module 102 and configured to provide the gate with a scan control signal SP for controlling the transistor to be turned on or off.

It is to be noted that the pixel circuit shown in FIG. 5 is merely an example and used only for describing the modules mentioned in the embodiment of the present application. In practice, the pixel circuit in the first pixel row and the second pixel row may be different from the embodiment shown in FIG. 5.

Since the data writing module is configured to write the data signal into the pixel, double-sided driving is used in the second display region so that a driving capability is improved, thereby improving display performance after the pixels emit light.

Optionally, as shown in FIGS. 6 to 10 (for clarity of illustration, the first scan control circuit and the second scan control circuit in the embodiment of FIG. 2 are not shown in FIGS. 6 to 10, which does not mean that the first scan control circuit and the second scan control circuit are not arranged in this embodiment), the display panel also includes a third scan control circuit 50, a fourth scan control circuit 60, a third scan line SL3, and a fourth scan line SL4, where the third scan line SL3 is electrically connected to the pixels in the first pixel row 11 and one third scan control circuit 50, and the fourth scan line SL4 is electrically connected to the pixels in the second pixel row 21 and one fourth scan control circuit 60. In one embodiment, the display panel also includes a master control circuit, which is electrically connected to the third scan control circuit 50 and the fourth scan control circuit 60 through signal lines and provides control signals for the third scan control circuit 50 and the fourth scan control circuit 60. The third scan control circuit 50 and the fourth scan control circuit 60 provide scan control signals for the first pixel row 11 and the second pixel row 21 in response to the control signals. Optionally, specific embodiments of the third scan control circuit 50 and the fourth scan control circuit 60 may refer to FIGS. 3 and 4. A master control circuit 70 provides CK signals required by the third scan control circuit 50 and the fourth scan control circuit 60 to control the transistors in the third scan control circuit 50 and the fourth scan control circuit 60 to be turned on or off, so as to provide the scan control signals for the first pixel row 11 and the second pixel row 21 through the output terminal OUT.

Specifically, as shown in FIGS. 6 to 9, the pixels in the pixel row are arranged horizontally, and the third scan line SL3 and the fourth scan line SL4 are each connected to only one scan control circuit, which is called the single-sided driving.

The third scan control circuit includes a third output transistor, and the fourth scan control circuit includes a fourth output transistor. For the definitions of the third output transistor and the fourth output transistor, reference may be made to the first output transistor and the second output transistor, and the details are not repeated here.

Figure 6:
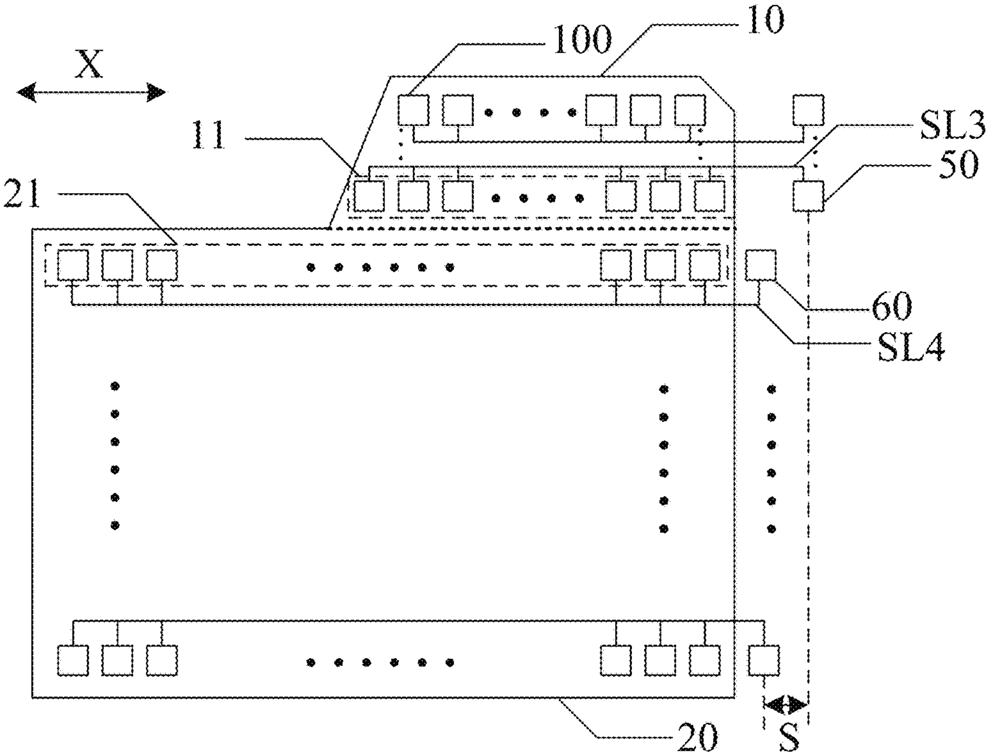
FIG. 6 is a structure diagram of another display panel according to an embodiment of the present disclosure.
Figure 7:
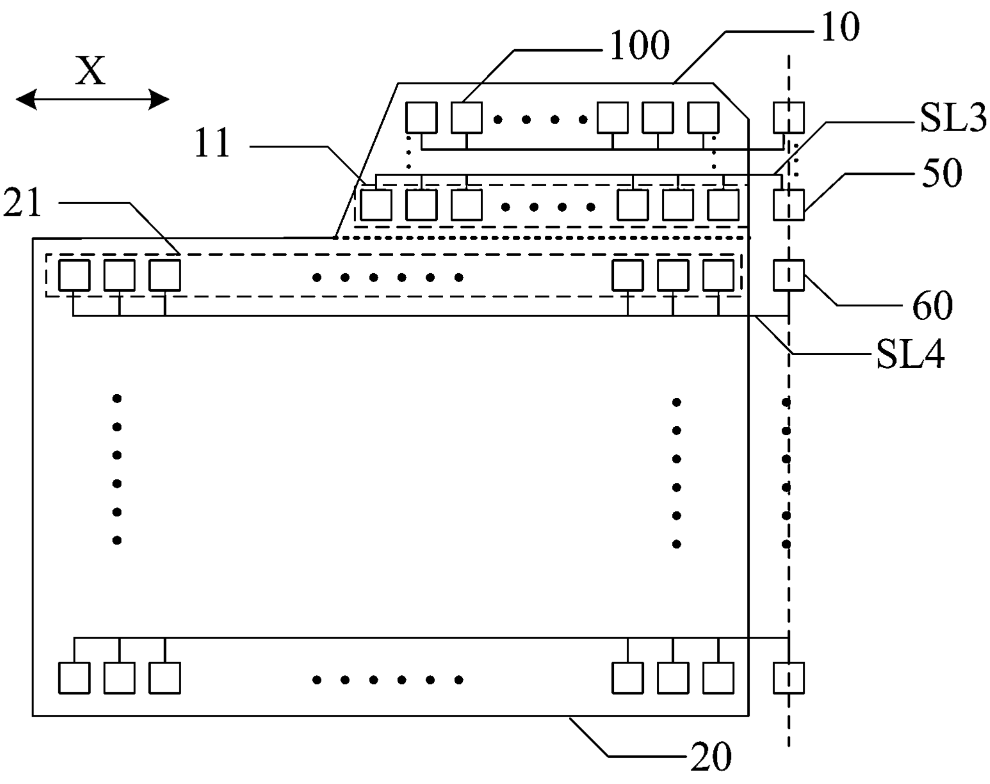
FIG. 7 is a structure diagram of another display panel according to an embodiment of the present disclosure.

In the case where the distance S between the third scan control circuit 50 and the fourth scan control circuit 60 in an arrangement direction X of pixels in a row is smaller than a first preset distance, as shown in FIG. 6 or 7, the ratio of a channel width-to-length ratio of the third output transistor to a channel width-to-length ratio of the fourth output transistor is a fourth ratio.

Specifically, the case where the distance between the third scan control circuit 50 and the fourth scan control circuit 60 in the arrangement direction X of the pixels in the row is smaller than the first preset distance may be that the third scan control circuit 50 and the fourth scan control circuit 60 are on the same side of the display panel, and the distance S between the third scan control circuit 50 and the fourth scan control circuit 60 in the arrangement direction X of the pixels in the row is relatively small due to process errors during production and manufacturing, for example, the embodiment shown in FIG. 6. Alternatively, the case may be that the third scan control circuit 50 and the fourth scan control circuit 60 are on the same side of the display panel and on the same line perpendicular to the arrangement direction X of the pixels in the row, for example, the embodiment shown in FIG. 7.

Figure 8:
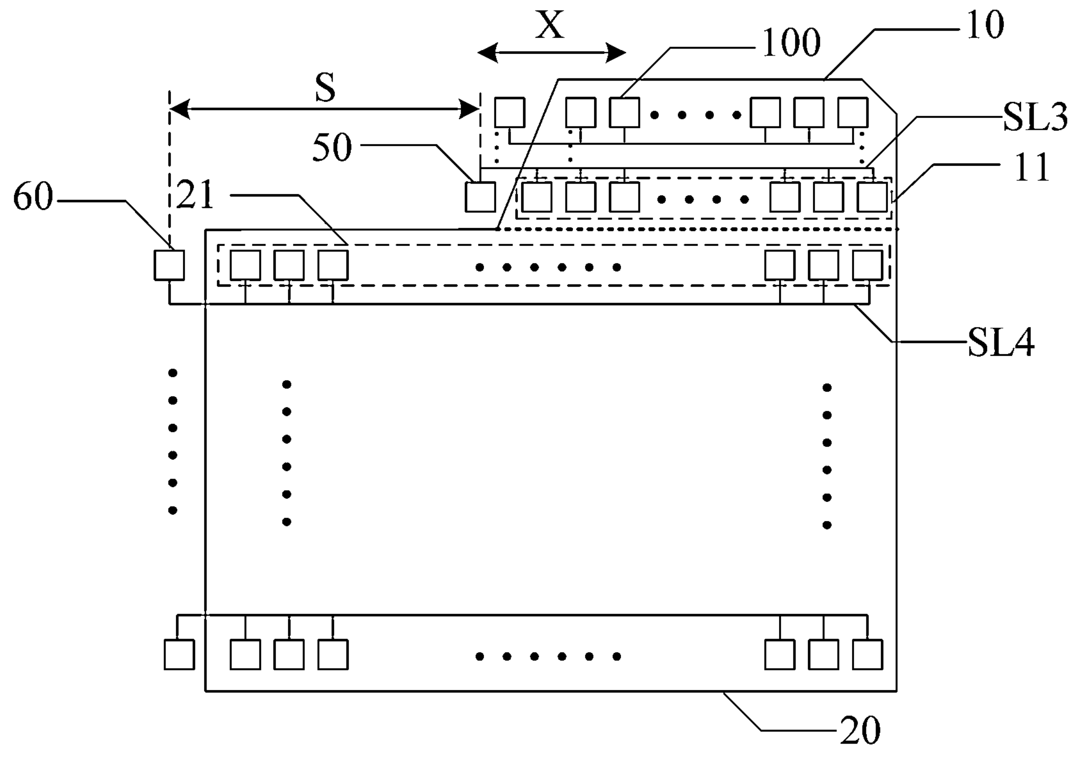
FIG. 8 is a structure diagram of another display panel according to an embodiment of the present disclosure.
Figure 9:
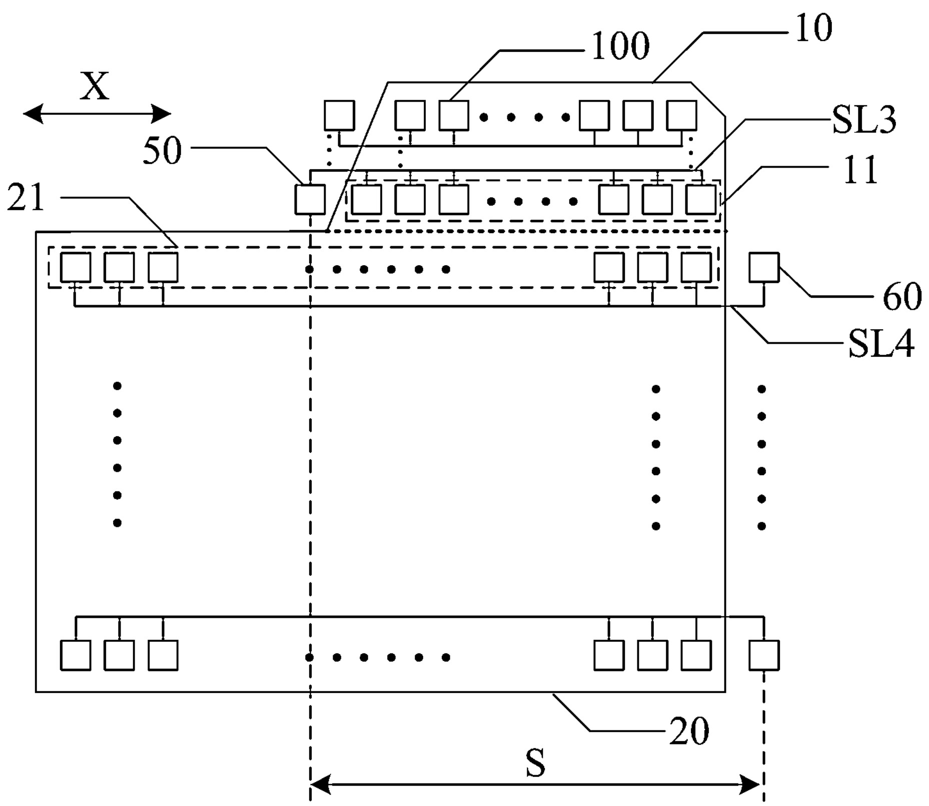
FIG. 9 is a structure diagram of another display panel according to an embodiment of the present disclosure.
Figure 10:
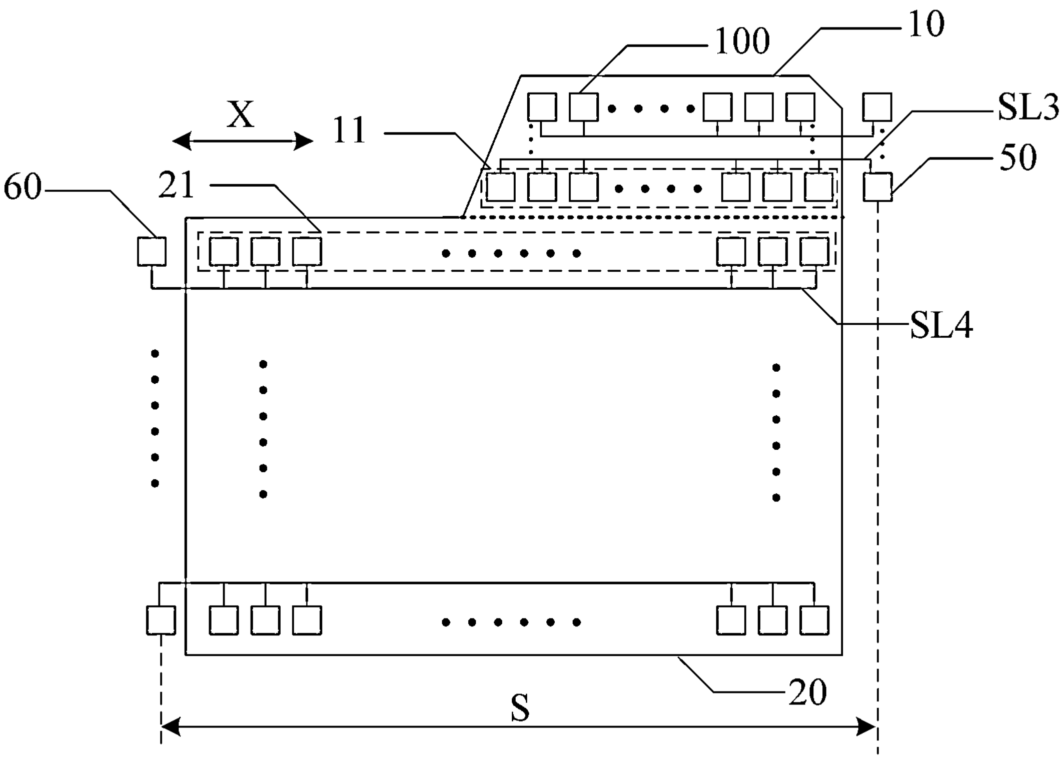
FIG. 10 is a structure diagram of another display panel according to an embodiment of the present disclosure.

Alternatively, in the case where the distance S between the third scan control circuit 50 and the fourth scan control circuit 60 in the arrangement direction X of the pixels in the row is larger than or equal to the first preset distance, as shown in FIG. 8 or 9 or 10, the ratio of the channel width-to-length ratio of the third output transistor to the channel width-to-length ratio of the fourth output transistor is a fifth ratio.

Specifically, the case where the distance S between the third scan control circuit 50 and the fourth scan control circuit 60 in the arrangement direction X of the pixels in the row is larger than or equal to the first preset distance may be that the third scan control circuit 50 and the fourth scan control circuit 60 are on the same side of the display panel and at the distance S from each other in the arrangement direction X due to the irregular shape of the panel, for example, the embodiment shown in FIG. 8. Alternatively, the case may be that the third scan control circuit 50 and the fourth scan control circuit 60 are on different sides of the display panel and thus are at the distance S from each other in the arrangement direction X, for example, the embodiment shown in FIG. 9 or 10.

Some modules in the pixel do not have too high requirements on the driving capability. To save a bezel area and a manufacturing cost of the display panel, a scan control circuit on a single side may be configured to provide scan control signals for these modules. However, relative to a panel regular in shape, the positions of scan control circuits in the special-shaped panel are also irregular, and the irregular arrangement inevitably results in different wire lengths of signal lines from the master control circuit to the scan control circuits (specifically, the wire lengths of CK signal lines), causing a delay of scan control between different regions and affecting the overall display of the screen. In the embodiment of the present disclosure, a relationship between the channel width-to-length ratios of the output transistors in the scan control circuits is set according to the positions of the scan control circuits so that the time difference of scan control between different regions can be further reduced, and the visual screen splitting between different regions can be avoided, thereby improving the overall display effect of the panel.

Specifically, the first preset distance may be set according to specific implementation circumstances such as panel size and process errors during manufacturing, which is not limited herein.

Optionally, the fourth ratio is smaller than the fifth ratio.

When the distance between the third scan control circuit and the fourth scan control circuit in the arrangement direction of the pixels in the row is smaller than the first preset distance, it indicates that the wire length from the master control circuit to the third scan control circuit and the wire length from the master control circuit to the fourth scan control circuit are substantially the same. However, since the number of pixels in the first pixel row is relatively small, the channel width-to-length ratio of the third output transistor needs to be reduced so that the third output transistor drives the pixels in the first pixel row slightly latter. When the distance between the third scan control circuit and the fourth scan control circuit in the arrangement direction of the pixels in the row is larger than or equal to the first preset distance, it indicates that the wire length from the master control circuit to the third scan control circuit is significantly greater than the wire length from the master control circuit to the fourth scan control circuit, and the increased wire has already made the third scan control circuit drive the pixels in the first pixel row slightly latter so that the channel width-to-length ratio of the third output transistor does not need to be changed.

Optionally, in the case where the distance between the third scan control circuit and the fourth scan control circuit in the arrangement direction of the pixels in the row is smaller than the first preset distance, a range of the fourth ratio $R_4$ is:

$$R_4 = \frac{p}{q} < 1;$$

where p denotes the channel width-to-length ratio of the third output transistor, and q denotes the channel width-to-length ratio of the fourth output transistor.

Optionally, the range of the fourth ratio $R_4$ is:

$$\frac{1}{3} \le R_4 < 1.$$

If the channel width-to-length ratio of the third output transistor is too small, the display performance of the first display region is significantly affected, and the control of the third scan control circuit is also affected. Thus, the channel width-to-length ratio of the third output transistor is set to be smaller than the channel width-to-length ratio of the fourth output transistor within a limited range.

Optionally, in the case where the distance between the third scan control circuit and the fourth scan control circuit in the arrangement direction of the pixels in the row is larger than or equal to the first preset distance, the fifth ratio $R_5$ is:

$$R_5 = \frac{p}{q} = 1 \pm \alpha;$$

where α denotes the process error parameter, n denotes the channel width-to-length ratio of the third output transistor, and q denotes the channel width-to-length ratio of the fourth output transistor. Specifically, the third output transistor and the fourth output transistor may be of the same type (p-type or n-type) and have the same physical parameters. However, since output transistors at different positions may exhibit a process error during production, the ratio of the channel width-to-length ratio of the third output transistor to the channel width-to-length ratio of the fourth output transistor is defined as the fifth ratio $R_5$.

Based on the pixel circuit shown in FIG. 5, optionally, each pixel in the first pixel row includes a first threshold compensation module, and each pixel in the second pixel row includes a second threshold compensation module, where both the first threshold compensation module and the second threshold compensation module may refer to the threshold compensation module 104 in the embodiment of FIG. 5. The third scan line is electrically connected to the first threshold compensation module and the one third scan control circuit, and the fourth scan line is electrically connected to the second threshold compensation module and the one fourth scan control circuit. Specifically, as shown in FIG. 5, each of the first scan line and the second scan line is connected to a gate of the transistor T5 as the threshold compensation module 104 and configured to provide the gate with a scan control signal S2N for controlling the transistor to be turned on or off.

The turning-on and coupling of the transistor in the threshold compensation module affects the writing of a threshold compensation voltage to a node N1 in FIG. 5, then affects the drive signal provided by the drive transistor T3 for the light-emitting element OLED, and ultimately affects light emission. Therefore, a delay between the scan control signal S2N provided for the first pixel row and the scan control signal S2N provided for the second pixel row needs to be minimized as much as possible, thereby avoiding the visual screen splitting between different regions and improving the overall display effect of the panel.

Based on the pixel circuit shown in FIG. 5, optionally, each pixel in the first pixel row includes a first drive initialization module, and each pixel in the second pixel row includes a second drive initialization module, where both the first drive initialization module and the second drive initialization module may refer to the drive initialization module 105 in the embodiment of FIG. 5. The third scan line is electrically connected to the first drive initialization module and the one third scan control circuit, and the fourth scan line is electrically connected to the second drive initialization module and the one fourth scan control circuit. Specifically, as shown in FIG. 5, each of the third scan line and the fourth scan line is connected to a gate of the transistor T4 as the drive initialization module 105 and configured to provide the gate with a scan control signal S1N for controlling the transistor to be turned on or off.

The turning-on and coupling of the transistor in the drive initialization module affects the writing of an initialization voltage VREF1 to the node N1 in FIG. 5, then affects the drive signal provided by the drive transistor T3 for the light-emitting element OLED, and ultimately affects the light emission. Therefore, a delay between the scan control signal S1N provided for the first pixel row and the scan control signal S1N provided for the second pixel row needs to be minimized as much as possible, thereby avoiding the visual screen splitting between different regions and improving the overall display effect of the panel.

Based on the pixel circuit shown in FIG. 5, optionally, each pixel in the first pixel row includes a first bias module and each pixel in the second pixel row includes a second bias module, where both the first bias module and the second bias module may refer to the bias module 101 in the embodiment of FIG. 5. The third scan line is electrically connected to the first bias module and the one third scan control circuit, and the fourth scan line is electrically connected to the second bias module and the one fourth scan control circuit. Specifically, as shown in FIG. 5, each of the first scan line and the second scan line is connected to a gate of the transistor T8 as the bias module 101 and configured to provide the gate with a scan control signal SP* for controlling the transistor to be turned on or off.

The turning-on and coupling of the transistor in the bias module affects the writing of a bias voltage DVH to a node N2 in FIG. 5, then affects the drive signal provided by the drive transistor T3 for the light-emitting element OLED, and ultimately affects the light emission. Therefore, a delay between the scan control signal SP* provided for the first pixel row and the scan control signal SP* provided for the second pixel row needs to be minimized as much as possible, thereby avoiding the visual screen splitting between different regions and improving the overall display effect of the panel.

Based on the pixel circuit shown in FIG. 5, optionally, each pixel in the first pixel row includes a first light-emitting element initialization module, and each pixel in the second pixel row includes a second light-emitting element initialization module, where both the first data writing module and the second data writing module may refer to the light-emitting element initialization module 103 in the embodiment of FIG. 5. The third scan line is electrically connected to the first light-emitting element initialization module and the one third scan control circuit, and the fourth scan line is electrically connected to the second light-emitting element initialization module and the one fourth scan control circuit. Specifically, as shown in FIG. 5, each of the third scan line and the fourth scan line is connected to a gate of the transistor T7 as the light-emitting element initialization module 103 and configured to provide the gate with the scan control signal SP* for controlling the transistor to be turned on or off.

The turning-on and coupling of the transistor in the light-emitting element initialization module affects the writing of an initialization voltage VREF2 to the cathode of the light-emitting element OLED and then affects the brightness of the light-emitting element OLED in a light emission stage. Therefore, the delay between the scan control signal SP* provided for the first pixel row and the scan control signal SP* provided for the second pixel row needs to be minimized as much as possible, thereby avoiding the visual screen splitting between different regions and improving the overall display effect of the panel.

Based on the pixel circuit shown in FIG. 5, optionally, each pixel in the first pixel row includes a first light emission control module and each pixel in the second pixel row includes a second light emission control module, where both the first light emission control module and the second light emission control module may refer to the transistor T1 and the transistor T6 in the embodiment of FIG. 5. The third scan line is electrically connected to the first light emission control module and the one third scan control circuit, and the fourth scan line is electrically connected to the second light emission control module and the one fourth scan control circuit. Specifically, as shown in FIG. 5, each of the third scan line and the fourth scan line is connected to gates of the transistor T1 and the transistor T6 and configured to provide the gates with a scan control signal EM for controlling the transistors to be turned on or off.

The turning-on and coupling of the transistor T1 and the transistor T6 affects the supply of the drive signal to the light-emitting element OLED and then affects the light emission. Therefore, a delay between the scan control signal EM provided for the first pixel row and the scan control signal EM provided for the second pixel row needs to be minimized as much as possible, thereby avoiding the visual screen splitting between different regions and improving the overall display effect of the panel.

Figure 11:
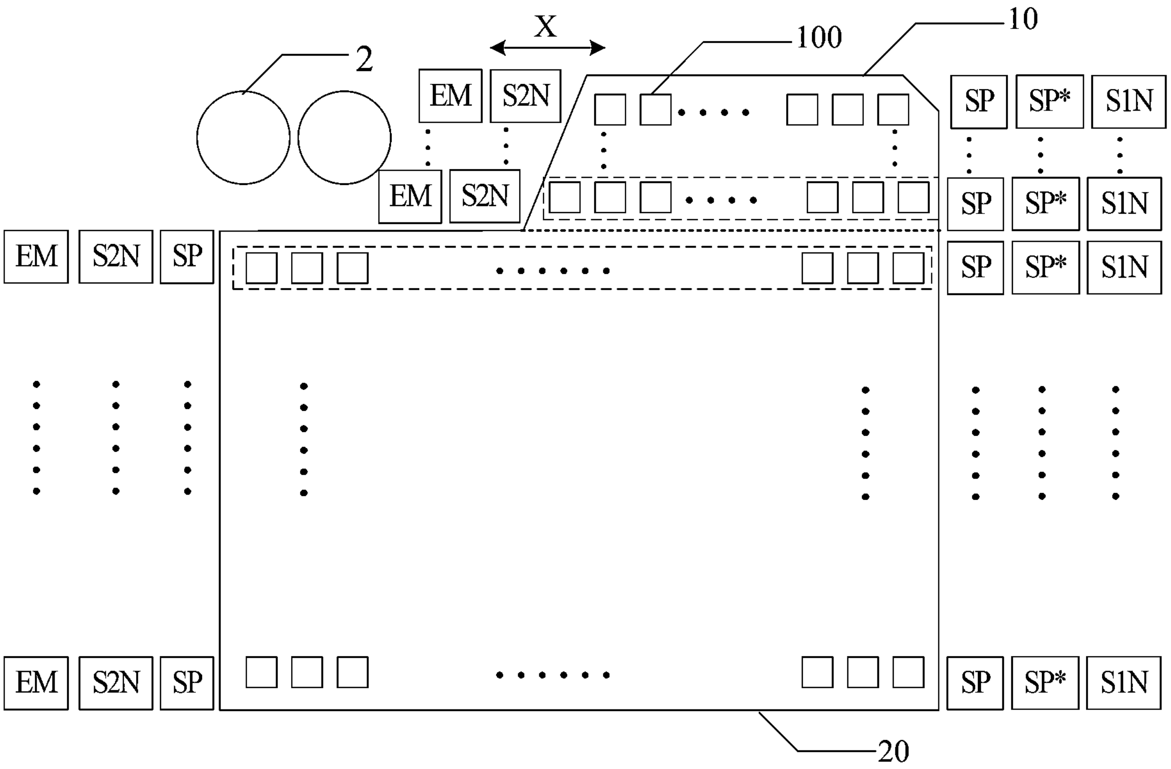
FIG. 11 is a structure diagram of another display panel according to an embodiment of the present disclosure.

The present disclosure also provides a complete embodiment of the display panel, as shown in FIG. 11 (for clarity of illustration, scan lines connecting scan control circuits to the pixel rows are omitted in FIG. 11, which does not mean the absence of the scan lines). The embodiment of FIG. 11 corresponds to the pixel circuit shown in FIG. 5 and is configured to provide the corresponding scan control signals for the pixel circuit shown in FIG. 5. In the second display region, the SP signal adopts the double-sided driving and the SP* signal, the S1N signal, the S2N signal, and the EM signal adopt the single-sided driving. In the first display region, the SP signal, the SP* signal, the S1N signal, the S2N signal, and the EM signal adopt the single-sided driving.

The channel width-to-length ratio of the output transistor in the scan control circuit providing the SP signal needs to be determined according to the number of pixels in the first pixel row and the number of pixels in the second pixel row in the preceding embodiment. It is to be noted that since the scan control circuit providing the SP signal in the second display region adopts the double-sided driving, even if the scan control circuit in the first display region is located on the other side as in the embodiment of FIG. 10, a signal delay cannot be implemented only by a wire length. Therefore, the method of determining the channel width-to-length ratio of the output transistor according to the number of pixels in the pixel row in the preceding embodiment needs to be adopted.

For the scan control circuits providing the SP* signal, the S1N signal, the S2N signal, and the EM signal, since the scan control circuits providing each of the S2N signal and the EM signal in different regions are relatively far from each other in the arrangement direction X of the pixels in the row, the output transistors in the scan control circuits in two regions may be of the same model. Since the scan control circuits providing each of the SP* signal and the S1N signal in different regions are on the same line perpendicular to the arrangement direction X, the channel width-to-length ratio of the output transistor in the scan control circuit in the first display region needs to be smaller than the channel width-to-length ratio of the output transistor in the scan control circuit in the second display region.

Based on the same inventive concept, in correspondence to the display panel in any one of the preceding embodiments, an embodiment of the present application further provides a display device including the display panel in any one of the preceding embodiments.

The preceding display device may be disposed in an electronic device, such as the foldable electronic device shown in FIG. 1 or other electronic devices to which the special-shaped display panel can be applied.

The display device in the preceding embodiment includes the corresponding display panel in any one of the preceding embodiments and has the beneficial effects of the corresponding embodiments, and the details are not repeated here.

It is to be noted that relationship terms such as "first" and "second" used herein are used merely to distinguish one entity or operation from another and are not necessarily used to require or imply any such actual relationship or order between these entities or operations. Furthermore, the term "comprising", "including", or any other variant thereof is intended to encompass a non-exclusive inclusion so that a process, method, article, or device that includes a series of elements not only includes these elements but also includes other elements that are not expressly listed or are inherent to such process, method, article, or device. In the absence of more restrictions, the elements defined by the statement "including a . . . " do not exclude the presence of additional identical elements in the process, method, article, or device that includes the elements.

The preceding are specific embodiments of the present disclosure that enable those skilled in the art to understand or implement the present disclosure. Various modifications to these embodiments are apparent to those skilled in the art, and the general principles defined herein may be implemented in other embodiments without departing from the spirit or scope of the present disclosure. Therefore, the present disclosure is not limited to the embodiments described herein but is to accord with the widest scope consistent with the principles and novel features disclosed herein.

What is claimed is:

1. A display panel, comprising a first display region and a second display region, wherein the first display region comprises a first pixel row, the second display region comprises a second pixel row, a number of pixels in the first pixel row is a, and a number of pixels in the second pixel row is b, wherein 0<a<b;

the display panel further comprises a first scan control circuit, a second scan control circuit, a first scan line, and a second scan line, wherein the first scan line is electrically connected to the pixels in the first pixel row and one first scan control circuit, and the second scan line is electrically connected to the pixels in the second pixel row and two second scan control circuits; and the first scan control circuit comprises a first output transistor, and the second scan control circuit comprises a second output transistor; wherein in a case where a ratio of the number of pixels in the first pixel row to the number of pixels in the second pixel row is within a first preset range, a ratio of a channel width-to-length ratio of the first output transistor to a channel width-to-length ratio of the second output transistor is a first ratio; and in the case where the ratio of the number of pixels in the first pixel row to the number of pixels in the second pixel row is within the first preset range, the first ratio $R_1$ is:

$$R_1 = 1 \pm \alpha;$$

wherein α denotes a transistor process error parameter.

2. The display panel according to claim 1, wherein in a case where the ratio of the number of pixels in the first pixel row to the number of pixels in the second pixel row is smaller than a minimum value of the first preset range, the ratio of the channel width-to-length ratio of the first output transistor to the channel width-to-length ratio of the second output transistor is a second ratio, and the second ratio is smaller than the first ratio, or wherein in a case where the ratio of the number of pixels in the first pixel row to the number of pixels in the second pixel row is larger than a maximum value of the first preset range, the ratio of the channel width-to-length ratio of the first output transistor to the channel width-to-length ratio of the second output transistor is a third ratio, and the first ratio is smaller than the third ratio.

3. The display panel according to claim 1, wherein in a case where the first pixel row is adjacent to the second pixel row, the ratio of the number of pixels in the first pixel row to the number of pixels in the second pixel row is within a second preset range, wherein a minimum value of the second preset range is larger than the minimum value of the first preset range, and a maximum value of the second preset range is smaller than the maximum value of the first preset range.

4. The display panel according to claim 3, wherein the first preset range is:

$$\frac{1}{3} \le \frac{a}{b} \le \frac{2}{3};$$

and the second preset range is:

$$\frac{2}{5} \le \frac{a}{b} \le \frac{3}{5};$$

wherein a denotes the number of pixels in the first pixel row, and b denotes the number of pixels in the second pixel row.

5. The display panel according to claim 1, wherein in the case where the ratio of the number of pixels in the first pixel row to the number of pixels in the second pixel row is smaller than a minimum value of the first preset range, the ratio of the channel width-to-length ratio of the first output transistor to the channel width-to-length ratio of the second output transistor is a second ratio; and in the case where the ratio of the number of pixels in the first pixel row to the number of pixels in the second pixel row is smaller than the minimum value of the first preset range, a range of the second ratio $R_2$ is:

$$R_2 < 1.$$

6. The display panel according to claim 5, wherein the range of the second ratio $R_2$ is:

$$\frac{1}{3} \le R_2 < 1.$$

7. The display panel according to claim 1, wherein in a case where the ratio of the number of pixels in the first pixel row to the number of pixels in the second pixel row is larger than a maximum value of the first preset range, the ratio of the channel width-to-length ratio of the first output transistor to the channel width-to-length ratio of the second output transistor is a third ratio; and in the case where the ratio of the number of pixels in the first pixel row to the number of pixels in the second pixel row is larger than the maximum value of the first preset range, a range of the third ratio $R_3$ is:

$$R_3 > 1.$$

8. The display panel according to claim 7, wherein the range of the third ratio $R_3$ is:

$$1 < R_3 \le \frac{4}{3}.$$

9. The display panel according to claim 1, wherein the first preset range is:

$$\frac{1}{3} \le \frac{a}{b} \le \frac{2}{3},$$

wherein a denotes the number of pixels in the first pixel row, and b denotes the number of pixels in the second pixel row.

10. The display panel according to claim 1, wherein the first output transistor is configured to provide a first clock signal for the pixels in the first pixel row, and the second output transistor is configured to provide a second clock signal for the pixels in the second pixel row.

11. The display panel according to claim 1, wherein the first scan control circuit further comprises a third output transistor, wherein a ratio of a channel width-to-length ratio of the third output transistor to the channel width-to-length ratio of the first output transistor is a preset ratio.

12. The display panel according to claim 1, wherein each of the pixels in the first pixel row comprises a first data writing module, each of the pixels in the second pixel row comprises a second data writing module, the first scan line is electrically connected to the first data writing module and the one first scan control circuit, and the second scan line is electrically connected to the second data writing module and the two second scan control circuits.

13. The display panel according to claim 1, wherein the display panel further comprises a third scan control circuit, a fourth scan control circuit, a third scan line, and a fourth scan line, wherein the third scan line is electrically connected to the pixels in the first pixel row and one third scan control circuit, and the fourth scan line is electrically connected to the pixels in the second pixel row and one fourth scan control circuit; and the third scan control circuit comprises a third output transistor, and the fourth scan control circuit comprises a fourth output transistor, wherein in a case where a distance between the third scan control circuit and the fourth scan control circuit in an arrangement direction of pixels in a row is smaller than a first preset distance, a ratio of a channel width-to-length ratio of the third output transistor to a channel width-to-length ratio of the fourth output transistor is a fourth ratio; or in a case where a distance between the third scan control circuit and the fourth scan control circuit in an arrangement direction of pixels in a row is larger than or equal to a first preset distance, a ratio of a channel width-to-length ratio of the third output transistor to a channel width-to-length ratio of the fourth output transistor is a fifth ratio.

14. The display panel according to claim 13, wherein the fourth ratio is smaller than the fifth ratio.

15. The display panel according to claim 13, wherein in the case where the distance between the third scan control circuit and the fourth scan control circuit in the arrangement direction of the pixels in the row is smaller than the first preset distance, a range of the fourth ratio $R_4$ is:

$$R_4 < 1.$$

16. The display panel according to claim 13, wherein in the case where the distance between the third scan control circuit and the fourth scan control circuit in the arrangement direction of the pixels in the row is larger than or equal to the first preset distance, the fifth ratio $R_5$ is:

$$R_5 = 1 \pm \alpha.$$

17. The display panel according to claim 13, wherein each of the pixels in the first pixel row comprises a first threshold compensation module, each of the pixels in the second pixel row comprises a second threshold compensation module, the third scan line is electrically connected to the first threshold compensation module and the one third scan control circuit, and the fourth scan line is electrically connected to the second threshold compensation module and the one fourth scan control circuit.

18. The display panel according to claim 13, wherein each of the pixels in the first pixel row comprises a first drive initialization module, each of the pixels in the second pixel row comprises a second drive initialization module, the third scan line is electrically connected to the first drive initialization module and the one third scan control circuit, and the fourth scan line is electrically connected to the second drive initialization module and the one fourth scan control circuit.

19. The display panel according to claim 13, wherein each of the pixels in the first pixel row comprises a first bias module, each of the pixels in the second pixel row comprises a second bias module, the third scan line is electrically connected to the first bias module and the one third scan control circuit, and the fourth scan line is electrically connected to the second bias module and the one fourth scan control circuit.

20. The display panel according to claim 13, wherein each of the pixels in the first pixel row comprises a first light-emitting element initialization module, each of the pixels in the second pixel row comprises a second light-emitting element initialization module, the third scan line is electrically connected to the first light-emitting element initialization module and the one third scan control circuit, and the fourth scan line is electrically connected to the second light-emitting element initialization module and the one fourth scan control circuit.

21. A display device, comprising a display panel, wherein the display panel comprises a first display region and a second display region, wherein the first display region comprises a first pixel row, the second display region comprises a second pixel row, a number of pixels in the first pixel row is a, and a number of pixels in the second pixel row is b, wherein $0<a<b$;

the display panel further comprises a first scan control circuit, a second scan control circuit, a first scan line, and a second scan line, wherein the first scan line is electrically connected to the pixels in the first pixel row and one first scan control circuit, and the second scan line is electrically connected to the pixels in the second pixel row and two second scan control circuits; and the first scan control circuit comprises a first output transistor, and the second scan control circuit comprises a second output transistor; wherein in a case where a ratio of the number of pixels in the first pixel row to the number of pixels in the second pixel row is within a first preset range, a ratio of a channel width-to-length ratio of the first output transistor to a channel width-to-length ratio of the second output transistor is a first ratio; and in the case where the ratio of the number of pixels in the first pixel row to the number of pixels in the second pixel row is within the first preset range, the first ratio $R_1$ is:

$$R_1 = 1 \pm \alpha;$$

wherein $\alpha$ denotes a transistor process error parameter.

* * * * *